United States Patent
Smith (10) Patent No.: US 7,162,670 B2
(45) Date of Patent: Jan. 9, 2007

(54) IBIST INTERCONNECT AND BRIDGE FAULT DETECTION SCHEME

(75) Inventor: Brian L. Smith, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1105 days.

(21) Appl. No.: 10/005,263

(22) Filed: Dec. 3, 2001

(65) Prior Publication Data

US 2003/0103462 A1 Jun. 5, 2003

(51) Int. Cl.
*G01R 31/28* (2006.01)
*G01R 31/26* (2006.01)
*G01F 11/00* (2006.01)

(52) U.S. Cl. .................... 714/715; 714/25; 714/31; 714/737; 324/765

(58) Field of Classification Search .................... None
See application file for complete search history.

(56) References Cited

U.S. PATENT DOCUMENTS

| | | |
|---|---|---|
| 5,969,538 A | 10/1999 | Whetsel |
| 6,018,810 A | 1/2000 | Olarig |
| 6,029,261 A | 2/2000 | Hartmann |
| 6,219,811 B1 | 4/2001 | Gruetzner et al. |
| 6,505,317 B1 * | 1/2003 | Smith et al. ................. 714/738 |

* cited by examiner

*Primary Examiner*—Guy Lamarre
*Assistant Examiner*—John J. Tabone, Jr.
(74) *Attorney, Agent, or Firm*—Meyertons Hood Kivlin Kowert & Goetzel, P.C.; Rory D. Rankin (57) ABSTRACT

A method and mechanism for detecting interconnect and bridge defects. Contact points in a chip are assigned placement designation such that no two adjacent points have the same designation. A transmitter, receiver, and optional transmitter/receiver test are then run. During the transmitter test, transmitters with a given designation drive a particular test pattern while other transmitters drive a different test pattern. Receivers compare received test patterns against expected patterns. During a receiver test, transmitters drive a test pattern corresponding to the placement designation of the receivers to which they are coupled. During a particular receiver test, transmitters coupled to receivers of a given designation drive a particular stream, while other transmitters drive a different stream. Receivers then compare received streams against an expected stream. Finally, the placement designation of a transmitter or receiver of an adjacent transmitter/receiver pair may be temporarily assigned an alternate designation. A transmitter or receiver test is then run and receivers check received test patterns against expected patterns.

23 Claims, 5 Drawing Sheets

IBIST INTERCONNECT AND BRIDGE FAULT DETECTION SCHEME

BACKGROUND OF THE INVENTION

1. Field of the Invention

This invention is related to the field of digital communications and, more particularly, to the test and debug of digital systems.

2. Description of the Related Art

As dependence on various electronic systems continues to increase, so too does the need for reliability. From a hardware perspective, reliability may be ascertained by testing at various levels. These levels of testing include system tests, printed circuit assembly (i.e. circuit board) tests and integrated circuit tests. Such tests seek to ensure proper fabrication and assembly of the various components of the system.

Numerous well known methods of test and debug exist for the purpose of debugging circuits and systems. One such method is to incorporate "built-in self test" (BIST) functionality into the design of a computer system. BIST involves moving test functionality directly onto the chip itself. With BIST functionality designed into a system, many test procedures may be accomplished at a higher speed than is otherwise possible. For example, by running tests at circuit speeds the duration of a test may be reduced. Other advantages of BIST may include simplifying any required external test equipment and reducing the cost and effort of generating test patterns and simulating faults.

Figure 1:
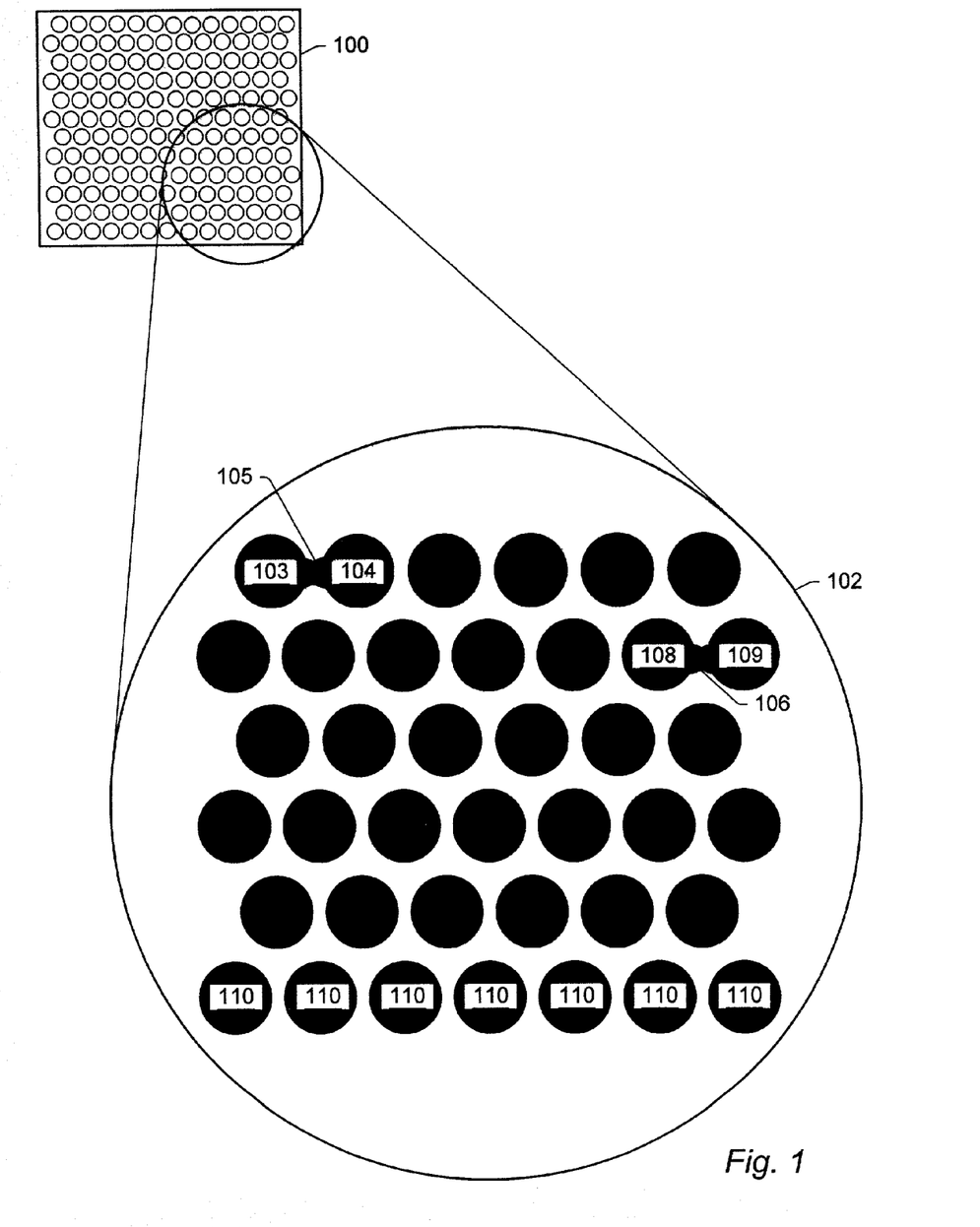
FIG. 1 illustrates bridging in a ball grid array.

As fabrication and miniaturization techniques advance, the possibility of certain defects in the fabricated part may increase. One such defect is called a bridge. FIG. 1 provides an example of a bridge fault in a fabricated part. FIG. 1 shows an integrated circuit 100 which has been fabricated and packaged using ball grid array (BGA) technology. BGA is a well known technology which enables high density, high I/O count packaging. Illustrated in FIG. 1 is an exploded view 102 of a portion of chip 100. View 102 shows an array of contact points, or balls, which are configured to transmit and/or receive signals. Generally speaking, when properly manufactured, each of the contact points should be electrically isolated from one another. For example, contact points 110 illustrate an even spacing around each point 110. However, two bridge defects 105 and 106 can be seen in view 102. A bridge 105 has been created between contact points 103 and 104. Also, a bridge 106 may be seen between contact points 108 and 109. These bridge defects results in an inability to simultaneously send and/or receive distinct signals from the bridged contact points. Consequently, errors in operation typically results. While the illustration in FIG. 1 illustrates a bridge defect in a BGA, other manufacturing techniques may similarly result in bridge type defects. Whether BIST is used, or some other type of testing, detecting bridge type defects is of great importance.

What is desired is a method and mechanism for detecting interconnect and bridge type faults.

SUMMARY OF THE INVENTION

A method and mechanism for detecting interconnect and bridge type defects is contemplated. In one embodiment, contact points such as in a BGA are assigned a relative placement designation. Each of the points are assigned a designation such that no two adjacent points have the same designation. Subsequent to assigning the designations, a series of tests are run. In one embodiment, the series of tests includes a transmitter bridge test, a receiver bridge test, and optionally a transmitter/receiver bridge test. During the transmitter bridge test, each transmitter with a given designation drives a particular test pattern stream. In addition, transmitters which have a designation other than the given designation drive a test pattern stream which is different than the particular test pattern stream. Receivers then compare their received test pattern streams against an expected stream. During a receiver bridge test, transmitters are configured to drive a test pattern stream according to the placement designation of the receivers to which they are coupled. During a particular test, all transmitter coupled to receivers of a given designation drive a particular stream, while other transmitters drive a different stream. Receivers then compare received streams against an expected stream. Finally, during a transmitter/receiver bridge test, the placement designation of either the transmitter or receiver, or both, in an adjacent transmitter/receiver pair is temporarily reassigned with a different designation in order to detect any previously undected adjacency defects. Subsequent to the reassignment, a transmitter or receiver bridge test may be run and receivers again check received test stream patterns against expected patterns.

Other embodiments and details of embodiments will be described in the detailed description.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION

In the following discussion, a BGA type packaging will be used for illustrative purposes. However, it is understood that the method and mechanism described herein may be applied to devices manufactured according to different techniques. In addition, an array of seven contact points and placement designations will be used for purposes of discussion. However, other configurations, designations schemes with fewer or more designations, and other arrangements are contemplated as well.

Figure 2A:
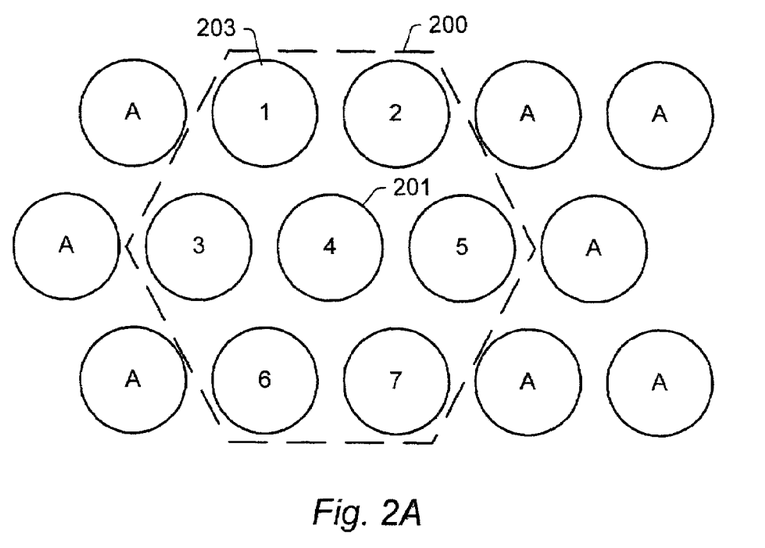
FIG. 2A illustrates one embodiment of relative pin placement.

FIG. 2 illustrates an array of contact points denoted "1"–"7" and "A" which may comprise a portion of a chip or circuit to be tested. In the example shown, a group of contact points 200 have been demarcated by a hexagon for purposes of discussion. Included in group 200 are seven contact points which have been arbitrarily numbered from 1 to 7. From the illustration, it can be seen that the contact point numbered 4 is adjacent to six other contact points, 1–3 and 5–7. Consequently, the possible bridging between contact point 4 and another contact point must be tested.

Because a bridge defect may result in the bridged contact points transmitting or receiving the same signal, one method for detecting such faults involves using distinct test patterns for contact points which are adjacent to one another. For example, in FIG. 2A seven distinct, distinguishable tests patterns may be used for each of contact points 1–7 to aid in identifying bridge defects. However, because a chip or package typically includes far more then seven contact points, and it may not be desirable to use a distinct test pattern for every contact point, a numbering scheme should be utilized which ensures that no two adjacent contact points have the same number.

Figure 2B:
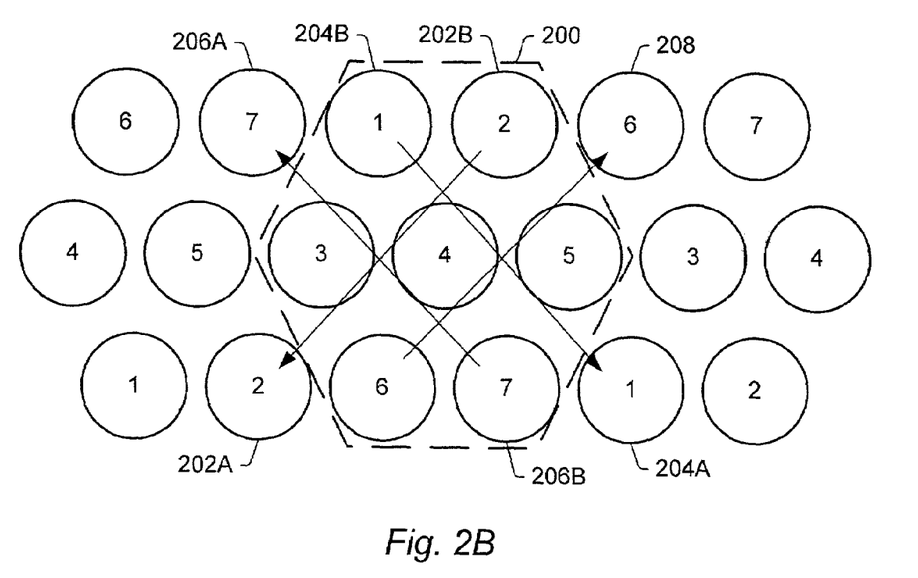
FIG. 2B illustrates one embodiment of relative pin placement.

In one embodiment, a designation scheme using only seven distinct numbers as described above is used. As already mentioned, the numbering of a given group of contact points is arbitrary. However, whatever numbering scheme is used, the scheme should be designed to ensure that no two adjacent contact points are given the same designation. FIG. 2B illustrates one embodiment of a numbering scheme in which no two adjacent contact points are given the same designation. As in FIG. 2A, FIG. 2B illustrates an array of contact points with a particular group 200 indicated by a hexagonal outline. In the embodiment shown, contact points within group 200 are numbered from 1–7 in any order. Contact points outside of, and adjacent to, group 200 are numbered with the same number of the contact point on the opposite side of group 200. For example, contact point 202A takes the designation of the contact point on the opposite corner of group 200, contact point 202B. Similarly, contact point 206A takes the designation of contact point 206B. Contact point 204A takes the same designation as contact point 204B. Other schemes which ensure no two contact point have the same designation are adjacent may be used as well. Such a scheme helps ensure that only extremely unlikely bridge defects, for example a bridge defect between 204A and 204B which does not involve other contact points, will be undetected.

Subsequent to providing a particular designation for each of the contact points, a method utilizing only a base test pattern stream and its inverse may be used in testing. In this embodiment, each transmitter with a given designation drives a particular test pattern stream. Transmitters which do not have the given designation drive the inverse of the particular test pattern stream. For example, in a given test, all transmitters with the given designation "3" are selected to drive a particular test pattern stream, X. All other transmitters, i.e., transmitters whose designation is 1, 2, 4, 5, 6, or 7, drive the inverse of the test pattern stream X, i.e., not X. So for example, if the test pattern stream X is a binary stream consisting of "001101010", the inverse of X would be the binary stream "110010101". Consequently, any transmitter adjacent to a transmitter with a designation of 3 is driving a different test pattern than that transmitter. Receivers receiving the stream X, and those receiving its inverse, may check the received stream against an expected value. A mismatch against the expected value may then be recorded as an error.

Figure 3:
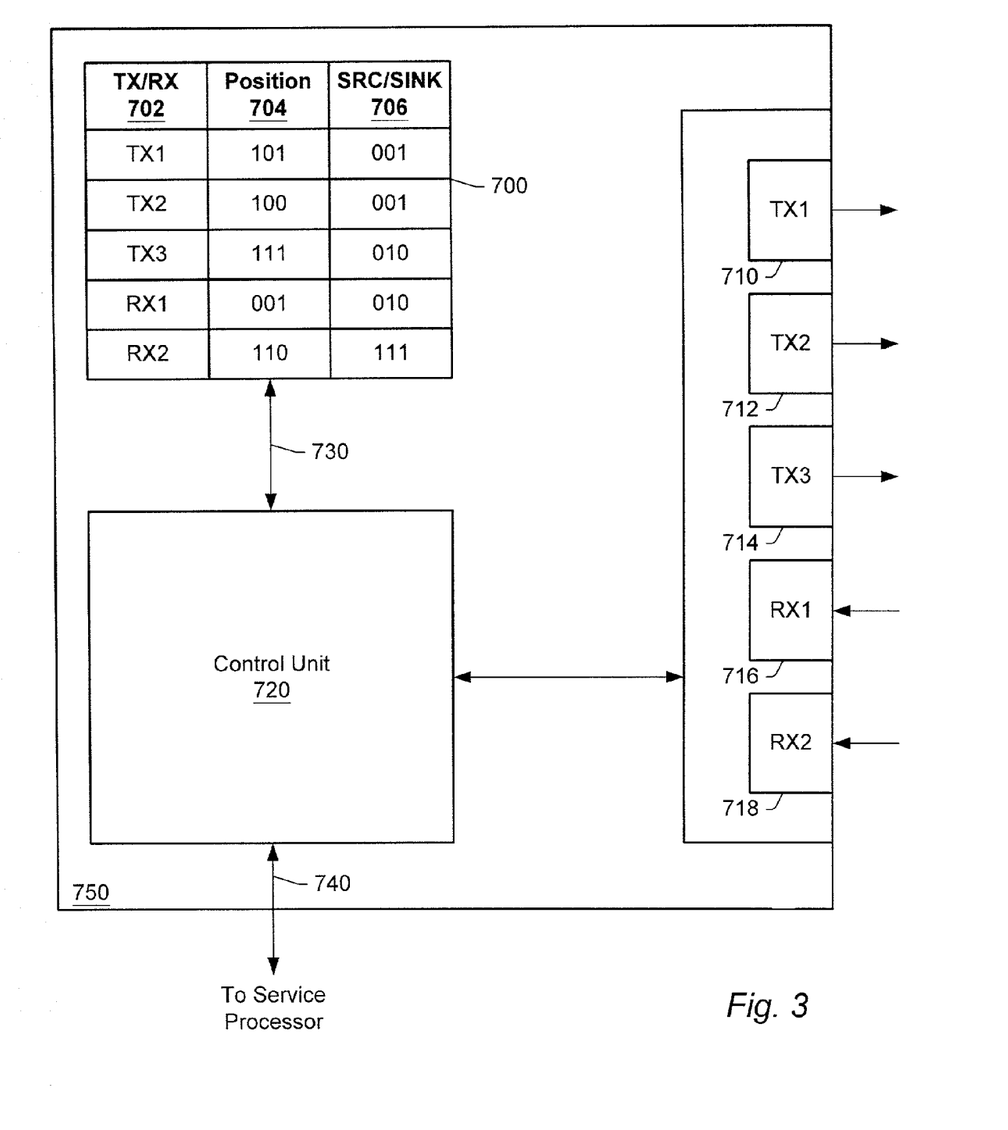
FIG. 3 is a block diagram illustrating one embodiment of a chip.

Turning now to FIG. 3, one embodiment of a device 750 configured for testing is shown. Device 750 may comprise a single chip on a circuit board, or a subset of circuitry within a particular chip. In the embodiment of FIG. 3, device 750 includes transmitters TX1 710, TX2 712, and TX3 714. Device 750 also includes receivers RX1 716 and RX2 718. A control unit 720 is coupled to transmitter and receivers 710–718. Other embodiments may include only transmitters or receivers, but not both. Also illustrated is circuitry 700, illustrated as a table, which is configured to identify the relative placements of transmitters and receivers 710–718 on device 750. In one embodiment, circuitry 700 comprises a group of programmable registers, though other circuitry configured to accomplish the same task may be utilized. Further, while circuitry 700 is shown as external to control circuit 720, circuitry may be included within control circuit 720.

In one embodiment, each transmitter and receiver 710–718 on device 750 is given one of designations 1–7 as described above, which is then programmed within device 750 as three bits. For example, table 700 identifies each transmitter and receiver in column 702 and its placement designation in column 704. Transmitter TX1 is given the binary designation "101", or 5. Transmitter TX3 is given the designation "111", receiver RX2 is given the designation "110", and so on. Also included in table 700 is a column 706 for indicating the source or sink of the corresponding transmitter or receiver. In the embodiment shown, entries in column 706 are not hard coded, but may be programmed at the time of test. During test, transmitters and receivers 710–718 may be coupled to a corresponding receiver or transmitter in a system. These coupled transmitters and receivers are also given a placement designation as described above. At the time of test, the placement designations of these coupled transmitters and receivers will be programmed into column 706 of table 700 as will be discussed further below.

In one embodiment, control unit 720 may be configured to program entries of table 700, including accessing the data for programming entries in column 706. Alternatively, an external service processor 740 coupled to control unit 720 may be configured to access the data for column 706 which is then provided to control unit 720 for programming the table 700. Still further, in an alternative embodiment, external circuitry such as a service processor 740 may be configured to obtain placement designations from devices under test and maintain all the corresponding source/sink relationships. Numerous alternatives and combinations are possible and are contemplated.

In addition, analysis may reveal, or a design may dictate, that a chip or device is to be used in a particular mode. As will be further discussed below, based on this knowledge, one or more bits of a placement designation may be hard coded to further facilitate testing. Embodiments which include programmable placement designations, hard coded designations, and a combination of the two are contemplated.

Figure 4:
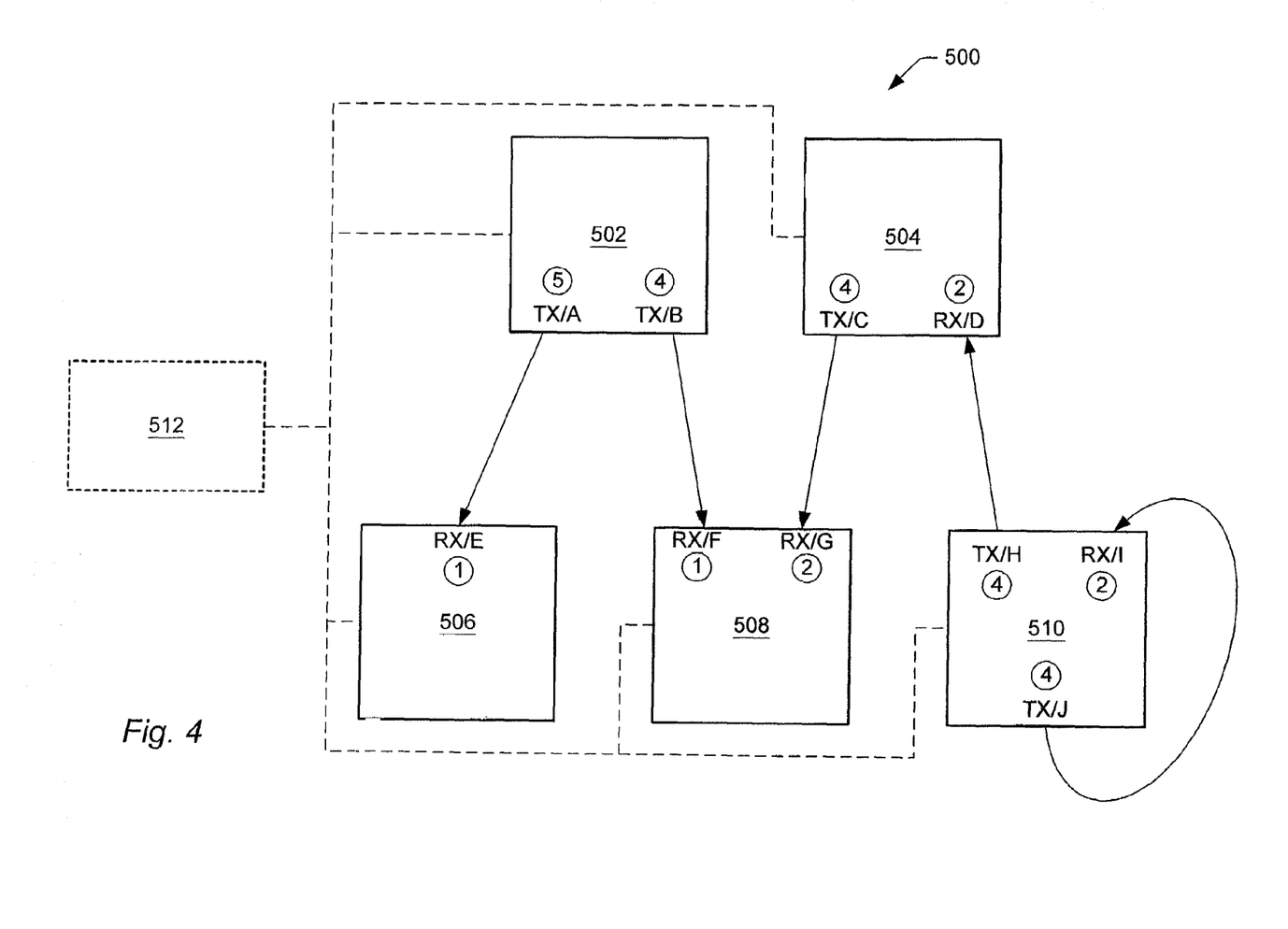
FIG. 4 illustrates one embodiment of a system.

Turning now to FIG. 4, one embodiment of a system 500 is illustrated. In the embodiment of FIG. 4, five entities 502–510 are shown. Also shown is a service processor 512 coupled to entities 502–510 which may be utilized in certain embodiments. In one embodiment, entities 502–510 are separate chips placed on a circuit board. However, in other embodiments each of entities 502–510 may comprise circuitry within a single chip, chips on separate circuit boards, or otherwise. Each of the entities illustrated in FIG. 4 include one or more transmitters and/or receivers with a particular placement designation indicated within a circle. Entity 502 includes transmitters TX/A with a placement designation of "5", and TX/B with a designation of "4". Entity 504 has a transmitter TX/C with designation "4", and a receiver RX/D with designation "2". Entity 506 has a receiver RX/E with designation "1". Entity 508 has a receiver RX/F with designation "1", and receiver RX/G with designation "2". Finally, entity 510 has transmitter TX/H with designation "4", receiver RX/I with designation "2", and transmitter TX/J with designation "4". TX/A is coupled to RX/E, TX/B is coupled to RX/F. TX/C is coupled to RX/G, TX/H is coupled to RX/D, and TX/J is coupled to RX/I. As used herein, "entity" may refer to a circuit, chip, or other device configurable to transmit or receive signals.

As discussed above, configuring adjacent transmitters to transmit disparate test patterns may provide an indication as to whether the transmitters have a bridge defect. For example, in one embodiment all transmitters of a given designation are configured to drive a particular test pattern while all other transmitters drive a different test pattern. In the example of FIG. 4, assume at some point during a test all transmitters designated "4" drive a particular test pattern while the other transmitters drive its inverse. Therefore, transmitters TX/B, TX/C, TX/H and TX/J drive the test pattern while transmitter TX/A drives the inverse of the test pattern. Pursuant to this test, receivers RX/E and RX/F expect to receive different patterns. If it is determined that receivers RX/E and RX/F did not receive their respective expected patterns, then a bridge fault between transmitters TX/A and TX/B may be indicated. In one embodiment, this test may be referred to as a "transmitter bridge test". However, this test may not provide an indication as to whether a bridge fault exists between receivers RX/F and RX/G. This problem arises because both receivers RX/F and RX/G are coupled to transmitters with the same placement designation and both receivers RX/F and RX/G expect to receive the same test pattern. Consequently, the correct expected results at receivers RX/F and RX/G may be the same as the results which are detected in the presence of a bridge fault.

In order to detect bridging between adjacent receivers, a "receiver bridge test" procedure may be utilized. In one embodiment of the receiver bridge test, each transmitter is configured to transmit test patterns corresponding to the placement designation of the receiver to which it is coupled. For example, in FIG. 4 transmitter TX/A would transmit test patterns corresponding to the placement designation of RX/E, transmitter TX/B would transmit test patterns according to the placement designation of receiver RX/F, transmitter TX/C would transmit the test pattern according to the placement designation of receiver RX/G, and so on. In one embodiment, a separate service processor 512 may be utilized to program each transmitter to transmit test patterns corresponding to a given placement designation. In other embodiments, entities 502–510 may include the functionality necessary to program the transmitters and/or receivers appropriately.

Once the transmitters have been programmed to transmit test patterns according to the placement designation of their coupled receivers, tests may be conducted. As an example, assume a receiver bridge test is conducted in which a test is conducted for each placement designation in turn. During testing, placement designation "2" may be selected. Therefore, each transmitter which is coupled to a receiver with a placement designation of "2" drives a particular test pattern, while other transmitters drive a different test pattern. Utilizing this procedure, receiver RX/G expects to receive the particular test pattern, while receiver RX/F expects to receive the different test pattern. Consequently, bridging between receivers RX/F and RX/G may be detected.

However, while the transmitter bridge test described above may detect bridging between adjacent transmitters, and the receiver bridge test may detect bridging between adjacent receivers, bridging between an adjacent transmitter and receiver may not be detected. Entity 504 illustrates an example wherein a transmitter TX/C is adjacent to a receiver RX/D. During the transmitter bridge testing, while transmitter TX/C was transmitting test patterns corresponding to placement designation "4", receiver RX/D was receiving test patterns from transmitter TX/H which also corresponds to placement designation "4". Further, during receiver bridge testing, while receiver RX/D was receiving test patterns corresponding to placement designation "2", transmitter TX/C was transmitting test patterns to receiver RX/G which also corresponds to placement designation "2". Consequently, neither the transmitter nor receiver bridge test generated test patterns which are distinguishable between transmitter TX/C and receiver RX/D.

To solve the adjacent transmitter/receiver problem, a transmitter/receiver (TX/RX) bridge test is performed. In a TX/RX bridge test, the placement designation of either a transmitter or receiver of a TX/RX adjacent pair is temporarily assigned a new non-conflicting designation. Subsequent to assigning the new designation, running either the transmitter bridge test or receiver bridge test may reveal bridging between the adjacent TX/RX pair. For example, referring to FIG. 4, during a TX/RX bridge test, transmitter TX/C may be assigned the placement designation of "3". Subsequently, during a transmitter bridge test, receiver RX/D will receive test patterns from transmitter TX/H corresponding to placement designation "4", while TX/C transmits test patterns corresponding to the designation "3". Consequently, the test patterns being transmitted and received by TX/C and RX/D, respectively, may be distinguished and a bridge may be detected. In such an embodiment, both the transmitter and the coupled receiver may be made aware of the new designation. The transmitter may require knowledge of the new designation in order to convey the pattern which corresponds to the new designation. In an embodiment wherein the receiver checks the received pattern against an expected pattern, the receiver may be made aware of the new designation as well. It should be noted, that when a received test pattern does not match an expected test pattern, a defect in the interconnect between the corresponding transmitter and receiver may also be indicated.

In one embodiment, transmitters may be configured to transmit test patterns corresponding to either their actual placement designation, or the placement designation of the receiver to which they are coupled. As previously discussed, the placement designation of a receiver corresponding to a transmitter may be programmable in a manner similar to that described in FIG. 3. In such an embodiment, a transmitter may be programmed to perform a receiver bridge test using a programmed placement designation which is different than that actually corresponding to the coupled receiver. For example, in FIG. 4 receiver RX/D may be assigned a placement designation of "3" for the purposes of a TX/RX test. Transmitter TX/H would then be programmed to transmit a test pattern corresponding to the placement designation "3" during the test. Transmitter TX/C would transmit a test pattern to receiver RX/G corresponding to placement designation "2". In this manner transmitter TX/C and receiver RX/D transmit and receive distinguishable test patterns, respectively.

It should be noted that analysis may reveal an assignment of placement designations which is more efficient than others. For example, in FIG. 4, a possible bridge between the adjacent transmitter TX/C and receiver RX/D may not be revealed by a transmitter bridge test or a receiver bridge test, because of the particular placement designations which have been assigned. This problem arises because each transmitter and receiver of the adjacent TX/RX pair transmits and receives according to the placement designation of their counterpart within the TX/RX pair. In the example shown, this problem is revealed by two condition, (1) TX/C is coupled to a receiver with the same placement designation as RX/D, and (2) RX/D is receiving from a transmitter with the same placement designation as TX/C. Consequently, this problem may be alleviated by avoiding either one of these two conditions during initial placement designations, which in turn may avoid the need for a TX/RX test.

Figure 5:
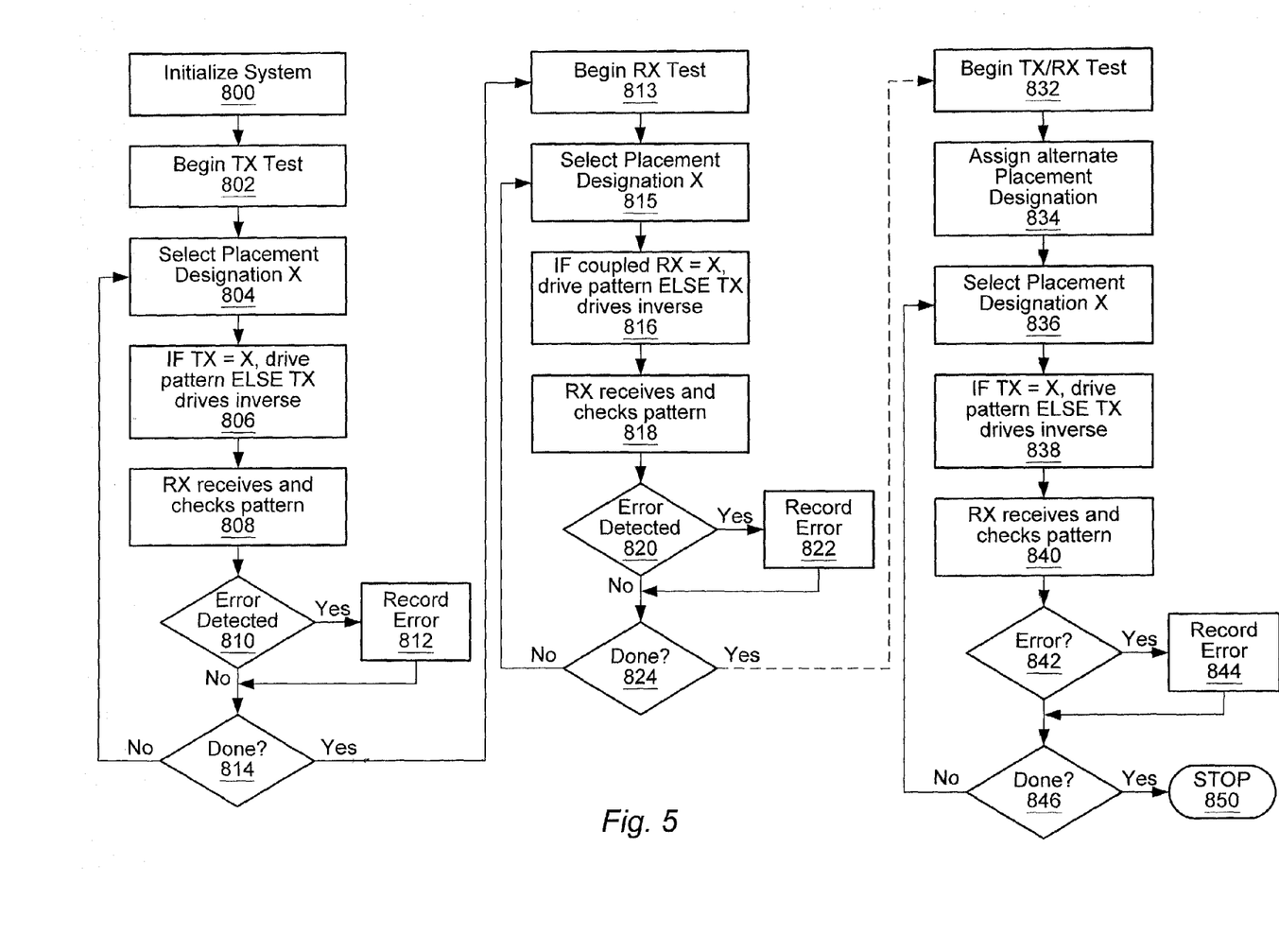
FIG. 5 illustrates one embodiment of a test method.

Turning now to FIG. 5, one embodiment of a method for performing bridge testing is described. Generally speaking, the embodiment includes performing a transmitter, receiver, and TX/RX test. While the example of FIG. 5 illustrates each of the broad categories of tests in a particular order, this need not be the case. Other embodiments may perform receiver bridge testing first, followed by TX/RX testing, and so on. The embodiment of FIG. 5 begins with an initialization (block 800) of the system. This initialization may be performed by a service processor, may be performed by embedded BIST circuitry, by a combination, or any other suitable mechanism. In one embodiment, initialization may include setting particular control registers, configuring test pattern generators, configuring placement designation tables, etc.

In the embodiment of FIG. 5, a placement designations of 1–7 will be used for illustrative purposes. Subsequent to beginning a transmitter bridge test (TX test) (block 802), a first placement designation is selected (block 804). In one embodiment, each of the placement designations being utilized (1–7 in this example) are selected in sequence. So, for example, placement designation "1" may be selected first. Those transmitters which have a placement designation of "1" drive a particular test pattern, while those transmitters with a designation other than "1" drive a different test pattern (e.g., the inverse of the particular test pattern) (block 806). Receivers coupled to these transmitters receive the transmitted test patterns and may perform a check at this time (block 808). Typically, the receivers are configured to expect a particular test pattern for the test. For example, those receivers coupled to a transmitter with a designation of "1" will expect the particular test pattern, while other receivers will expect its inverse. Other testing methods may be used as well. If a mismatch is detected (block 810), an error may be recorded (block 812). Otherwise, a determination may be made as to whether the test has been performed for all the placement designations (block 814). If the TX testing is not done, control returns to block 804 where the next placement designation is selected. In this manner, an iterative loop may be formed wherein the blocks 804–814 are performed for each of the designations 1–7.

Once it is determined that the TX testing has been performed for all the placement designations (block 814), control transfers to block 813 to begin receiver bridge testing (RX test). During block 813, each transmitter is configured to transmit a test pattern stream corresponding to the placement designation of the receiver to which it is coupled. A first of the placement designations is then selected (block 815) for testing. Those transmitters which are coupled to a receiver with the selected placement designation drive a particular test pattern, while the other transmitters drive a different test pattern. Receivers then receive and may check patterns for errors (block 818). If errors are detected, they are recorded (822). Subsequently (block 824), a determination is made as to whether the RX test is done (i.e., all placement designations under consideration have been tested). If the RX testing is not done, control returns to block 815. If RX testing is done, control may then transfer to block 832 to optionally begin TX/RX testing.

During TX/RX testing, alternate temporary placement designations are assigned to either a transmitter or receiver which is part of a transmitter/receiver adjacent pair. In one embodiment, alternate placement designations may be permanently configured into a system and stored in a table such as table 700. Alternatively, alternate placement designations may be assigned dynamically during test initialization, or otherwise. Both designations for a given adjacent pair may or may not be simultaneously given an alternate designation during a test. For example, referring back to FIG. 4, entity 504 includes the adjacent pair TX/C and RX/D. One of these is assigned a different designation. For example, RX/D may be assigned a placement designation of "3". Similarly, entity 510 includes the adjacent pair TX/J and RX/I. One of these is also temporarily assigned an alternate placement designation.

Subsequent to assigning alternate designations (block 834), a first placement designation is selected for testing. Similar to the RX test and TX test, in one embodiment each of the designation 1–7 are selected in turn. Block 838 indicates that those transmitters with a designation corresponding to the selected designation drive a particular test pattern, while the other transmitters drive a different pattern. In an embodiment wherein the designation of transmitters has been temporarily altered (block 834), a TX type test may be performed during block 838. That is, those transmitters whose own (temporary) designation matches the selected designation drive the particular test pattern. Alternatively, in an embodiment wherein the designation of receivers is temporarily altered, those transmitters whose coupled receiver has a (temporary) designation matching the selected placement designation drive the particular test pattern. Subsequently, the patterns are received (block 840), checked (blocks 842, 844), and a determination is made as to whether the TX/RX testing is done (block 846). Once all designations have been tested, the bridging test is done (block 850).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for detecting device fabrication faults in a system, said method comprising:
    transmitting a first data via a first transmitter, wherein the first data corresponds to a first placement designation assigned to the first transmitter;
    transmitting a second data via a second transmitter, wherein the second data corresponds to a second placement designation assigned to the second transmitter, and wherein the second placement designation is different than the first placement designation;
    receiving the first data at a first receiver;
    receiving the second data at a second receiver; and
    detecting a fabrication fault in response to determining one or both of the received first and second data do not match an expected data.

2. The method of claim 1, wherein said first transmitter and second transmitters are adjacent, said first placement designation corresponds to said first transmitter, said second placement designation corresponds to said second transmitter, and wherein said first and second receiver are not adjacent.

3. The method of claim 1, wherein said first receiver and said second receiver are adjacent, said first placement designation corresponds to said first receiver, said second placement designation corresponds to said second receiver, and wherein said first and second transmitters are not adjacent.

4. The method of claim 1, wherein said first receiver and said second transmitter are adjacent, and wherein said first placement designation corresponds to said first transmitter, and said second placement designation corresponds to said second transmitter.

5. The method of claim 1, wherein said first receiver and said second transmitter are adjacent, and wherein said first placement designation corresponds to said first receiver, and said second placement designation corresponds to said second receiver.

6. The method of claim 1, further comprising assigning placement designations to transmitters and receivers, wherein the placement designation are assigned such that no two adjacent transmitters or receivers have the same placement designation.

7. The method of claim 6, wherein each of the placement designations are selected from one of seven unique designations.

8. The method of claim 1, wherein each of the first and second data comprise a binary test pattern stream, and wherein the second data is distinguishable from the first data.

9. The method of claim 6, further comprising utilizing a temporary alternate placement designation for the first transmitter prior to transmitting the first and second data.

10. The method of claim 6, further comprising utilizing a temporary alternate placement designation for the first receiver prior to transmitting the first and second data.

11. An entity configured to perform device fabrication fault testing, said entity comprising:
a signal connector configured to transmit a signal, wherein said connector is assigned a first placement designation; and
a control unit configured to:
transmit a first data via said signal connector, wherein said first data corresponds to said first placement designation, in response to detecting said first placement designation has been selected for a transmitter test;
transmit a second data different from said first data via said signal connector in response to detecting a placement designation different from said first placement designation has been selected for a transmitter test;
transmit a third data via said signal connector, wherein said third data corresponds to a second placement designation, in response to detecting said signal connector is coupled to a first receiver, said second placement designation corresponds to said first receiver, and said second placement designation has been selected for a receiver test; and
transmit a fourth data different from said third data via said signal connector in response to detecting a placement designation different from said second placement designation has been selected for a receiver test;
wherein in response to receiving data transmitted by the control unit, a receiver is configured to detect a fabrication fault in response to determining data received from the control unit does not match expected data.

12. The entity of claim 11, wherein said control unit is further configured to access a table, wherein said table is configured to associate signal connectors with placement designations.

13. The entity of claim 12, wherein said table is programmable.

14. The entity of claim 11, wherein said entity comprises a plurality of signal connectors, wherein each of said plurality of signal connectors are assigned a placement designation, and wherein no two adjacent signal connectors are assigned a same placement designation.

15. The entity of claim 11, wherein each of the first, second, third, and fourth data comprise a binary test pattern stream, and wherein the second data is distinguishable from the first data.

16. An entity configured to facilitate device fabrication fault testing, said entity comprising:
a signal connector configured to receive a signal, wherein said connector is assigned a first placement designation; and
a control unit configured to:
receive a first data via said signal connector;
detect a first device fabrication fault in response to detecting:
said signal connector is coupled to a transmitter assigned a second placement designation;
said second placement designation has been selected for a transmitter test; and
said first data does not correspond to said second placement designation;
detect a second device fabrication fault in response to detecting:
said first placement designation has been selected for a receiver test; and
said first data does not correspond to said first placement designation.

17. The entity of claim 16, wherein said control unit is further configured to compare said first data to an expected data, wherein said expected data corresponds to a placement designation for a current test.

18. The entity of claim 16, wherein said entity comprises a plurality of signal connectors, wherein each of said plurality of signal connectors are assigned a placement designation, and wherein no two adjacent signal connectors are assigned a same placement designation.

19. A system configured to perform device fabrication fault testing comprising:
a first entity including a first transmitter, wherein said first transmitter comprises a first signal connector, and wherein the first signal connector is assigned a first placement designation; and
a second entity including a first receiver, wherein said first receiver comprises a second signal connector, and wherein said second signal connector is assigned a second placement designation;
wherein in response to detecting a transmitter test:
the first entity is configured to convey a first data which corresponds to said first placement designation, and the second entity is configured to:

expect to receive said first data, in response to detecting the selection of said first placement designation; and detect a fabrication fault in response to determining received data does not match the first data;

the first entity is configured to convey a second data different from said first data, in response to detecting the selection of a third placement designation which is different from said first placement designation, and the second entity is configured to:

expect to receive said second data, in response to detecting the selection of said third placement designation; and detect a fabrication fault in response to determining received data does not match the second data;

wherein in response to detecting a receiver test:

the first entity is configured to convey a third data which corresponds to said second placement designation, and the second entity is configured to:

expect to receive said third data, in response to detecting the selection of said second placement designation, and detect a fabrication fault in response to determining received data does not match the third data;

the first entity is configured to convey a fourth data different from said third data, in response to detecting the selection of a fourth placement designation which is different from said second placement designation, and the second entity is configured to:

expect to receive said second data, in response to detecting the selection of said fourth placement designation; and detect a fabrication fault in response to determining received data does not match the fourth data.

20. The system of claim 19, wherein both said first and second entities comprise a plurality of signal connectors, wherein each of said plurality of signal connectors are assigned a placement designation, and wherein no two adjacent signal connectors are assigned a same placement designation.

21. The system of claim 19, further comprising a table configured to associate signal connectors with placement designations.

22. The system of claim 21, further comprising a service processor separate from, but coupled to, said first and second entities, wherein said service processor is configured to program said table, and initiate said transmitter test and said receiver test.

23. The system of claim 19, wherein each of the first, second, third, and fourth data comprise a binary test pattern stream, and wherein the second data is distinguishable from the first data.

* * * * *